United States Patent

[11] 3,603,773

[72] Inventor Joseph Carlstein
East Meadow, N.Y.
[21] Appl. No. 853,718
[22] Filed Aug. 28, 1969
[45] Patented Sept. 7, 1971
[73] Assignee Vernitron Corporation
Great Neck, N.Y.

[54] DIGITAL PULSE RATE GENERATOR
9 Claims, 4 Drawing Figs.

[52] U.S. Cl. ........................................................ 235/154, 235/92 CP, 235/92 CC, 340/347 DA
[51] Int. Cl. ........................................................ G06f 5/06, H03k 13/256
[50] Field of Search .......................................... 235/154, 92, 196; 340/347 DA, 347 DD; 328/159

[56] References Cited
UNITED STATES PATENTS
2,685,054 7/1954 Brenner et al. ............... 235/154
3,017,098 1/1962 Haanstra ...................... 235/154 X

*Primary Examiner*—Daryl W. Cook
*Assistant Examiner*—Joseph M. Thesz, Jr.
*Attorney*—Edward H. Loveman

ABSTRACT: In a variable pulse rate generator, a digital number is applied as parallel bits to a first bit register which stores and then transfers the bits to a bit adder under control of a clocked logic circuit. The bit adder applies its parallel bit output to a second bit register which feeds the bits back to the adder for accumulation. Periodically the adder applies a most significant bit to a pulse shaper thus creating a variable frequency output proportional to the value of the original digital number.

PATENTED SEP 7 1971 3,603,773

INVENTOR
JOSEPH CARLSTEIN

BY Edward H. Loveman
ATTORNEY

INVENTOR
JOSEPH CARLSTEIN

BY

Edward H. Loveman

ATTORNEY

DIGITAL PULSE RATE GENERATOR

The invention relates to a variable pulse rate generator, and more particularly to a variable pulse rate generator which generates from a fixed frequency source, a train of pulses having a frequency proportional to an input digital number.

Although the variable pulse rate generator to be described has general applications, one of the more important uses of such a generator is to drive a digital-to-synchro convertor which produces synchro output data in analog form, proportional to the magnitude of a digital input. Another use is in a system for correcting digital output data of a synchro-to-digital convertor for errors due to the rate of change of synchro input data between successive computations of the digital output data by the converter According to the invention, a digital number consisting of binarily weighted parallel bits is applied to a first bit register which stores the number. An input strobe pulse changes the data in the register on command to the most recent value of the digital numbers. The input strobe pulse is also applied to a clock logic circuit which inhibits the action of a bit adder and a second bit register while the new data is being inserted into the first bit register. The digital number is applied as one input to the adder and the output of the second bit register is a second input to the adder. When permitted by the clock logic circuit, the sum of these two inputs is applied from the adder to the second bit register thus modifying its outputs. The second register thus accumulates successive first register numbers until a carry output is applied to a pulse shaper. The pulse shaper therefore has a variable frequency pulse output, the frequency of which is determined by the magnitude of the original digital number stored in the first bit register.

The primary object of the instant invention is to provide a pulse generator with a frequency dependent on a magnitude of an input signal.

Another object of the instant invention is to provide a variable pulse rate generator having a frequency proportional to a digital number.

These and other objects and many of the attendant advantages of this invention will be readily appreciated as the same become better understood by reference to the following detailed description when considered in connection with the accompanying drawings, wherein FIG. 1 is a diagram of a variable pulse rate generator embodying the invention.

Figure 1:
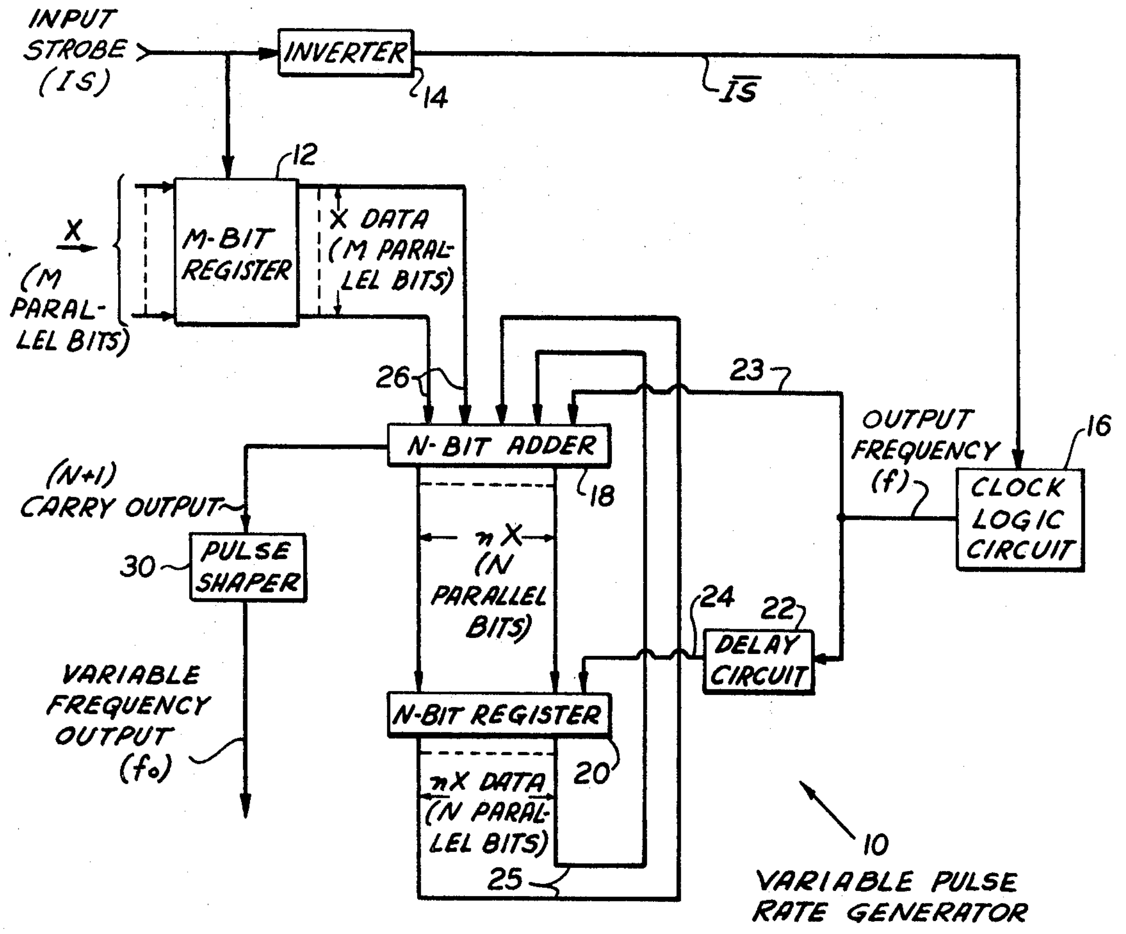

Referring now to the drawings, wherein like reference numerals designate like parts throughout the figures thereof, there is shown in FIG. 1, input data which may be a digital number X consisting of M binarily weighted bits which are applied to the M-bit register 12 at the input of the variable pulse rate generator 10. The input data may be parallel bits derived from a serial-to-parallel data converter (not shown) or may be parallel bits originally applied via parallel lines from a parallel bit source. M-bit register 12 is used to store the value of number X, which is gated into a register 20 by a clock input strobe pulse IS. In this instance X is assumed to be a binary digital number. The strobe pulse IS is used to change the data stored in the M-bit register 20 whenever so desired by the operator of the system. The IS pulse is inverted in an inverter 14 and the inverted IS pulse is applied to a logic circuit 16 to inhibit the action of associated circuitry, namely an N-bit adder 18 and the N-bit register 20, whenever a new value of X is inserted for storage in the M-bit register 12. By this technique incorrect X data is prevented from being processed by the variable pulse rate generator 10 e.g. whenever the IS pulse and clock pulse are coincident. The output of logic circuit 16 may be delayed slightly whenever this coincidence occurs to permit the new X data to stabilize to its correct value before being used.

Bit adder 18 and Bit register 20 are capable of handling N bits, where N is greater than or equal to M. The register 20 stores the output of the adder 18, with the new data taken from the output of the adder 18 and stored in the register 20 with each pulse from the logic circuit 16. A delay is provided by a delay circuit 22 to the pulses arriving via path 24 so that the pulse strobes the new data into the register 20 slightly after the same pulse (undelayed) arriving via path 23 has been applied to the adder 18, and the new output X of the adder has had time to stabilize. The delay must be short enough so that the data output of the register 20 has stabilized to its new value before the next pulse is generated by the logic circuit 16.

The data output of register 20 is fed back via paths 25 to adder 18, as one of the inputs thereof. The data from the register 12 is applied via paths 26 to other inputs of the adder 18 and is entered into the least significant bit positions of the adder 18. Consequently, if at a certain instant of time the register 20 has an output $n$X (N parallel bits), the next pulse from the logic circuit 16 adds ($n$X)+X, giving ($n$+1) X as the output of the adder 18 which then strobes ($n$+1) X into the register 20 so that the register output now represents ($n$+1) X data. This procedure is allowed to continue indefinitely. Periodically the value of $n$X will reach a value where the difference between it and the maximum value ($2^n-1$) storeable in the register 20 is less than X apart, i.e. a$(2^N-1)-(nX)<X$. When this occurs, the next clock pulse give $(nX)+X=(n+1)X>(2^N-1)$, and the Nth carry output of the N-bit adder 18 becomes a conventional logic "1."This signal is applied to a pulse shaper 30 which creates a pulse output at some frequency $f_o$.

The average frequency of these output pulses $f_o$is exactly proportional to the value of X as can readily be shown mathematically. Furthermore $f_o=(x/2^n)f$and since $f$ is the fixed frequency of the clock strobe pulse IS, it follows that the variable frequency $f_o$ is proportional to the magnitude of the digital number X applied to the system. Stated another way, while the frequency $f$ of the clock strobe pulse is kept fixed, the output frequency $f_o$ of the variable pulse rate generator is proportional to the magnitude of the digital input X.

Figure 2:
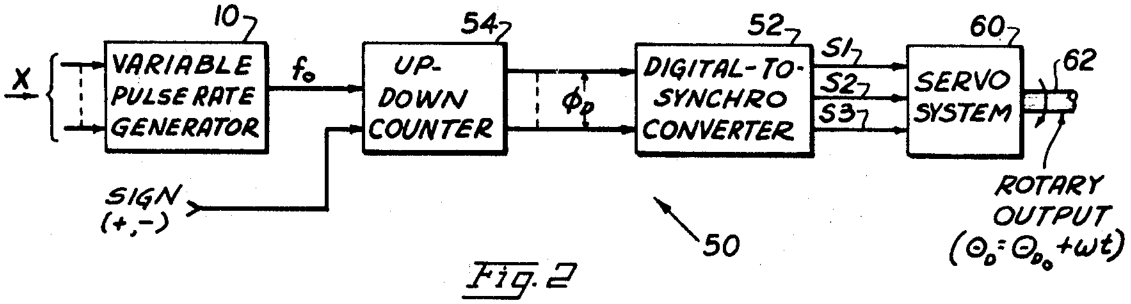
FIGS. 2 and 3 are diagrams of two converter systems each employing a variable pulse rate generator as shown in FIG. 1.

FIG. 2 shows one possible application of the variable pulse generator 10 as described above in connection with FIG. 1. The generator is employed in a system 50 in which variable angular output velocity is obtained from a digital input X. System 50 includes a digital-to-synchro converter 52 whose output voltages represent angular data having a variable rate of change, depending on the magnitude of a digital input X. Digital data $\theta_D$, representing an angle, is fed to the converter 52, which generates analog output voltages similar to those of a synchro or resolver, and represents this angular information by means of their relative ratios. The variable output voltages are applied to a servosystem 60 which may have an output shaft 62 rotatable at a variable rate depending on the variable voltage applied to the servosystem.

In converter 52, output voltages are related in magnitude by the equations $V_1=V\sin\Phi$; $V_2=V\text{sine}\,(\Phi_o-120^{\circ\circ})$, $V_3=V\sin\,(\Phi_o-240^\circ)$. These voltages can be used to excite any device normally excitable from a synchro transmitter, such as the servosystem 60. It is desired that the converter outputs S1, S2 and S3 represent an angle changing at some constant rate or angular velocity (W). It is therefore necessary to feed into the converter 52 digital data $\Phi_D$, such that $\Phi_D=\theta_{Do}$ Wt. This is accomplished by using the output $f_o$ of the variable pulse rate generator 10 as the serial input to an up-down counter 54. The counter is set or strobed to a value of $\Phi_{Do}$ at zero time. The output bits of the counter are fed to the converter 52. The input digital number X applied to the variable pulse rate generator 10 must be proportional to the desired angular velocity. The angular velocity of shaft 62 will then be coordinated with and controlled by the magnitude of the digital input number X, which represents the desired angular velocity.

In the up-down counter 54, each pulse changes the data stored therein by one least significant bit, having an angular value of Y degrees per least significant bit, depending on the particular converter 52 employed. Thus $W=(XYf_o/2^n)$ where the sign of X is used to determine whether $f_o$ pulses increase or decrease the stored value of the up-down counter. As an example for a 10-bit digital-to-synchro converter 52, $Y$=0.3515625° per least significant bit. With the value of $f_o=(2^N)$, then $W=(X)$ 0.3515625°/second, is the linear relationship between X and the angular data velocity W. The arrangement of system 50 allows simultaneous precise control of analog angle and angular velocity output data, or analog voltage and voltage rate of change data, by the use of appropriate digital inputs and converters. The system can employ a digital-to-resolver converter in place of the digital-to-synchro converter 52 in which case the output voltages will be related in magnitude by the equations $V_1=V\sin\Phi_D$ and $V_2=V\cos\Phi_D$. In any case the converter can be used to excite any device normally excitable from a synchro transmitter, resolver transmitter, or potentiometer.

Figure 3:
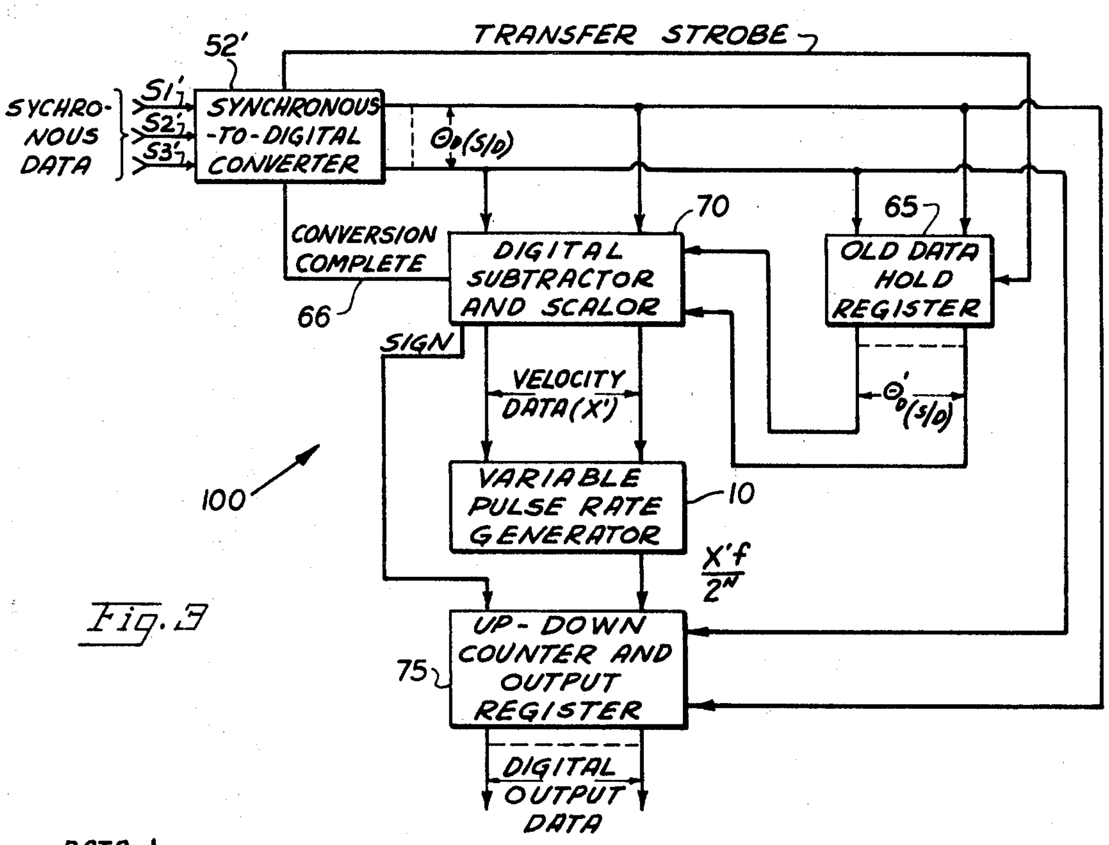

FIG. 3 is a diagram of a system 100 employed to correct the digital output data of a synchro-to-digital converter 52' for errors due to rate of change of the input data between successive computations of the digital output data by the converter. The principles of the invention are applicable to correct similar errors of a resolver to digital converter or analog voltage-to-digital converter. Converter 52' evaluates the analog input data at inputs S1', S2', S3' and converts it to digital form, (i.e. synchro voltage ratios to digital angle data, etc.) at established periodic intervals determined by the circuit of the converter.

Figure 4:
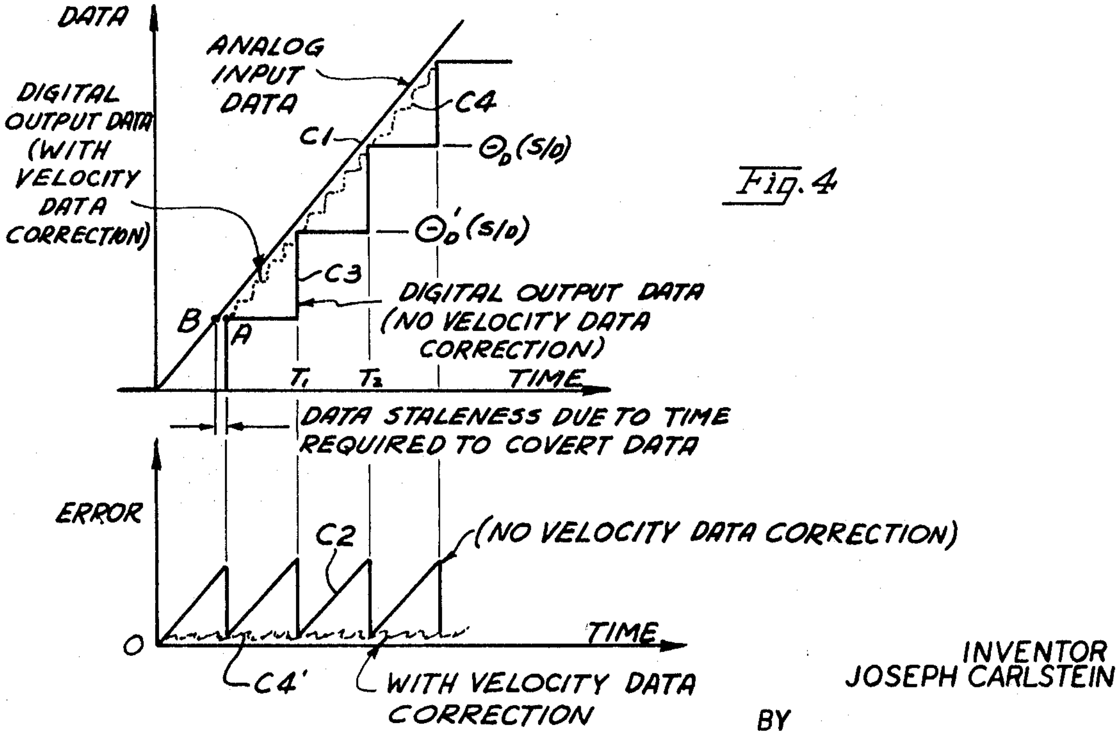
FIG. 4 is a pulse diagram used in explaining the system of FIG. 3.

It frequently happens that between two successive evaluations of digital data appearing at an output of a converter such as converter 52', there is such a large rate of change of input data to the converter that rather large discrepancies exist between the digital output and the actual input during portions of the interval between updates. Referring to FIG. 4, it will be noted the velocity of the input analog data shown by curve C1 results in output data errors shown in curve C2 which increase to a peak value just before new data is computed by the converter, plus some minimum staleness error (B−A), which is due to the time the converter takes to generate a digital output A on curve C3 for a given input sample B on curve C1. These errors can be corrected by a constant or slowly changing input velocity in an arrangement such as shown in FIG. 3 for a synchro-to-digital converter application.

Referring to FIG. 3 the output of converter 52' is $\theta_D$(S/D) where D represents "digital" and S represents "synchro". The converter internally generates new data, but before presenting this information as the latest data it must indicate that the present output data should be transferred to an old data hold register 65. This is accomplished by inserting the last data output $\theta_D$(S/D) into the register 65 just before the data output $\theta_D$(S/D) is allowed to change by means of a transfer strobe between the converter 52' and the register 65. Following the transfer strobe, the value of the output $\theta_D$(S/D) is updated by the converter to its last or most current computed value. The conversion complete output on line 66 indicates that new data has been presented which is at that instant a perfect representation of the input data to the converter (assuming no converter errors and no data staleness due to time required to convert data). This output is used to actuate a digital subtractor and scalor 70 to compute the velocity data based on current data $\theta_D$(S/D) and previous data $\theta'_D$(S/D). This velocity data is properly scaled to be used as input X' to a variable pulse generator 10 as previously described. The output on line 66 is also used to insert output $\theta_D$(S/D) into an up-down counter and output register 75 which is made equal to output data $\theta_D$(S/D) at the instant following presentation of this data by the converter 52'. Following this, the variable pulse rate generator output is used to serially update the digital output data at a rate proportional to velocity data X' with the sign of X' determining the direction.

In the procedure just described the digital output data of register 75 corresponds exactly with digital output data converter 52' immediately following the computation of such data, with continuous correction for input data velocity between updates as shown on curves C4 and C4' in FIG. 4. The steps shown in these curves for velocity corrected data depend on the resolution of the velocity correction data, which in turn depends on the number of bits of X' used. The staleness of data which exists can be corrected for separately by parallel insertion of correction data into the up-down counter and output register 75 at the same time output $\theta_D$(S/D) is inserted. The correction equals the velocity data X' computed as follows $\{[\theta_D(S/D)-\theta'_D(S/D)]/(t_2-t_1)\}$=Velocity Data=$X'$, multiplied or scaled by the time required by converter 52' to compute new data. Thus, the correction may be accomplished by inserting data X' and $\theta_D$(S/D) into an adder with data X' properly scaled and strobing the output of this adder into the counter and register 75, rather than inserting data $\theta_D$(S/D) directly by the "conversion complete" logic level. This will move the curve C4 in FIG. 4 to touch or overlap the analog input curve C1 and will shift the error curve C4' down to the zero line (centered or touching, depending on the scaling employed for data X') ) in FIG. 4, so that velocity related errors are thus eliminated.

It should be understood that the principles employed in system 100 are applicable to other types of converters, and that other types of variable pulse generators may be used.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

What is claimed is:

1. An electronic computer system for generating a train of pulses whose frequency is proportional to a digital number, comprising a source of input strobe pulses a first register having a plurality of inputs and capable of storing a plurality of binarily weighted bits representing a digital number, said register responsive to an input strobe pulse from said source to change the number stored in said register;

a multiple bit adder arranged to receive stored parallel bits from said first register;

a second register adapted to store a plurality of binarily weighted bits and arranged to receive parallel bits from said multiple bit adder;

a clock logic circuit for providing clock pulses and arranged to control said adder and to pass new parallel bits to said second register with each clock pulse;

means for feeding a multiple bit output from said second register to said adder to add to bits received from said first register until said adder generates a carry output; and a pulse shaper arranged to receive said carry output from said adder to produce a pulse output at a variable frequency which is proportional to the magnitude of said digital number.

2. An electronic computer system as defined in claim 1 further comprising means for inverting the input strobe pulse from said source and applying the inverted pulse to said clock logic circuit in inhibit action of said adder and said second register while a new digital number is being inserted into said first register and thereby prevent incorrect digital data from being processed in said adder and said second register whenever an input strobe pulse and a clock pulse are coincident.

3. An electronic computer system as defined in claim 2 further comprising delay circuit means interposed between said clock logic circuit and said second register to provide a time delay in each clock pulse arriving at said second register with respect to an undelayed clock pulse applied to said adder from said clock logic circuit, whereby new data is passed to said second register from said adder after the new data has had time to stabilize at the output of said adder.

4. An electronic computer system as defined in claim 3 further comprising a counter arranged to receive the variable frequency pulses from said pulse shaper;

a digital-to-analog converter arranged to receive digital data from said counter; and a servosystem having a rotary output means, said servosystem being arranged to receive and respond to analog data from said converter, said analog data and said digital number both being representative of a desired rate of rotation of said rotary output means of said servosystem, whereby said rotary output means rotates at a variable rate depending on the magnitude of the digital number applied to and stored in said first register.

5. An electronic computer system as defined in claim 3 further comprising a counter arranged to receive the variable frequency pulses from said pulse shaper;

a digital-to-synchro converter arranged to receive digital data from said counter; and a servosystem having a rotary output means, said servosystem being arranged to receive and respond to synchro data from said converter, said synchro data and said digital number both being representative of a desired rate of rotation of said rotary output means of said servosystem, whereby said rotary output means rotates at a variable rate depending on the magnitude of the digital number applied to and stored in said first register.

6. An electronic computer system as defined in claim 3 further comprising a counter arranged to receive the variable frequency pulses from said pulse shaper;

a digital-to-resolver converter arranged to receive digital data from said counter; and a servosystem having a rotary output means, said servosystem being arranged to receive and respond to resolver data from said converter, said resolver data and said digital number both being representative of a desired rate of rotation of said rotary output means of said servosystem, whereby said rotary output means rotates at a variable rate depending on the magnitude of the digital number applied to and stored in said first register.

7. An electronic computer system as defined in claim 3 further comprising a synchro-to-digital converter;

a digital subtractor and scalor arranged to receive digital output data from said converter;

a third register arranged to receive and store old digital output data from said converter while new digital output data is applied to said subtractor and scalor;

means for applying the old digital data to said subtractor and scalor along with the new digital data from said converter to produce digital velocity data;

means for applying said velocity data as parallel bits to said first register; and a counter and output register arranged to receive pulses of variable frequency from said pulse shaper whereby said counter and output register produce a digital output which precisely represents the digital output last computed by said converter.

8. An electronic computer system as defined in claim 3 further comprising, a resolver-to-digital converter;

a digital subtractor and scalor arranged to receive digital output data from said converter;

a third register arranged to receive and store old digital output data from said converter while new digital output data is applied to said subtractor and scalor;

means for applying the old digital data to said subtractor and scalor along with the new digital data from said converter to produce digital velocity data;

means for applying said velocity data as parallel bits to said first register; and a counter and output register arranged to receive pulses of variable frequency from said pulse shaper whereby said counter and output register produce a digital output which precisely represents the digital output last computed by said converter.

9. An electronic computer system as defined in claim 3 further comprising, a voltage-to-digital converter;

a digital subtractor and scalor arranged to receive digital output data from said converter;

a third register arranged to receive and store old digital output data from said converter while new digital output data is applied to said subtractor and scalor;

means for applying the old digital data to said subtractor and scalor along with the new digital data from said converter to produce digital velocity data;

means for applying said velocity data as parallel bits to said first register; and a counter and output register arranged to receive pulses of variable frequency from said pulse shaper whereby said counter and output register produce a digital output which precisely represents the digital output last computed by said converter.